United States Patent [19]

Turner et al.

[11] Patent Number: 5,736,828
[45] Date of Patent: Apr. 7, 1998

[54] ELECTRIC MACHINE CONTROLLER

[75] Inventors: Michael J. Turner, Leeds; Alan R. Jewell, W. Yorks, both of England

[73] Assignee: Switched Reluctance Drives, Ltd., Harrogate, United Kingdom

[21] Appl. No.: 499,895

[22] Filed: Jul. 11, 1995

[30]     Foreign Application Priority Data

Jul. 12, 1994 [GB] United Kingdom ............ 9414005

[51] Int. Cl.$^6$ ............................................. H02P 1/46
[52] U.S. Cl. ................... 318/701; 318/254; 318/138; 318/439
[58] Field of Search ................... 318/701, 138, 318/254, 439

[56]           References Cited

U.S. PATENT DOCUMENTS

| | | | |
|---|---|---|---|
| 3,743,906 | 7/1973 | Torok | 318/254 |
| 4,172,232 | 10/1979 | Joyes | 318/139 X |
| 4,172,233 | 10/1979 | Joyes | 318/139 X |
| 4,707,650 | 11/1987 | Bose | 318/685 |
| 4,933,621 | 6/1990 | MacMinn et al. | 318/696 |
| 5,163,170 | 11/1992 | Grabowski | 318/139 X |
| 5,180,960 | 1/1993 | Austermann | 318/701 |

FOREIGN PATENT DOCUMENTS

| | | | |
|---|---|---|---|
| 0 276 624 | 8/1988 | European Pat. Off. | H02K 17/26 |
| 0 276 625 | 8/1988 | European Pat. Off. | H02P 8/00 |
| 0 343 845 | 11/1989 | European Pat. Off. | H02K 16/06 |
| 0 534 761 | 3/1993 | European Pat. Off. | H02P 7/00 |
| 2 587 559 | 3/1987 | France | H02M 1/08 |
| WO 90/16111 | 12/1990 | WIPO | H02P 6/02 |

*Primary Examiner*—Karen Masih
*Attorney, Agent, or Firm*—Arnold, White & Durkee

[57] ABSTRACT

A controller for a switched electric machine, especially a switched reluctance motor, takes timing information from a rotor position transducer to generate a switch-off output at a point near maximum phase inductance in a phase inductance cycle. A switch-on signal is generated after a delay but still within the phase inductance cycle. A simple form of single-pulse control is thereby achieved. A comparator is also provided which monitors phase winding current. A pulse generator is actuated by the comparator when the winding current exceeds a reference level and is used to control the motor in a chopping mode at low speeds and is disabled by the comparator at higher speeds when the single-pulse control is used.

17 Claims, 7 Drawing Sheets

ELECTRIC MACHINE CONTROLLER

FIELD OF THE INVENTION

This relates to electric motor controllers. The invention is particularly applicable to a controller for a switched reluctance machine.

BACKGROUND OF THE INVENTION

Known controllers for switched reluctance (SR) motors and generators can offer reasonably flexible control, i.e. wide torque and speed ranges with high efficiency, but this is at the expense of complexity and, therefore, manufacturing cost.

Figure 1:
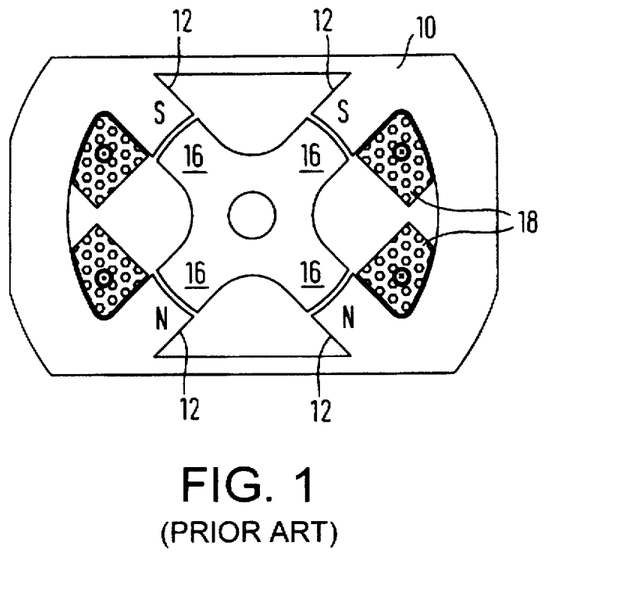
FIG. 1 is an cross-section of a prior art switched reluctance motor construction.

A form of single-phase SR machine is shown in FIG. 1 of the drawings. This is more fully described in EP-A-0343845. It comprises a stator 10 defining four stator poles 12 and a rotor 14 defining four rotor poles 16. Windings 18 are arranged, in this form of SR machine, to create adjacent poles of similar polarity. More conventional single-phase SR machines are arranged to create poles of alternate polarity.

The term 'motor' s used below, but it will be appreciated by the skilled person that, where appropriate, the term covers the same machine in a generating mode unless a distinction particular to one or the other is being made.

The theory of operation of SR motors is well known. For example, the paper 'The Characteristics, Design and Applications of Switched Reluctance Motors and Drives' by Stephenson et al. presented at PCIM '93 Conference and Exhibition at Nurnberg, Germany, Jun. 21 st–24th 1993, discusses the general principles. FIGS. 2 (a) to (d) of the drawings illustrate well-known examples of switching circuits used for controlling the applied voltage and the current in the phase winding of a switched reluctance motor.

Figure 3A:
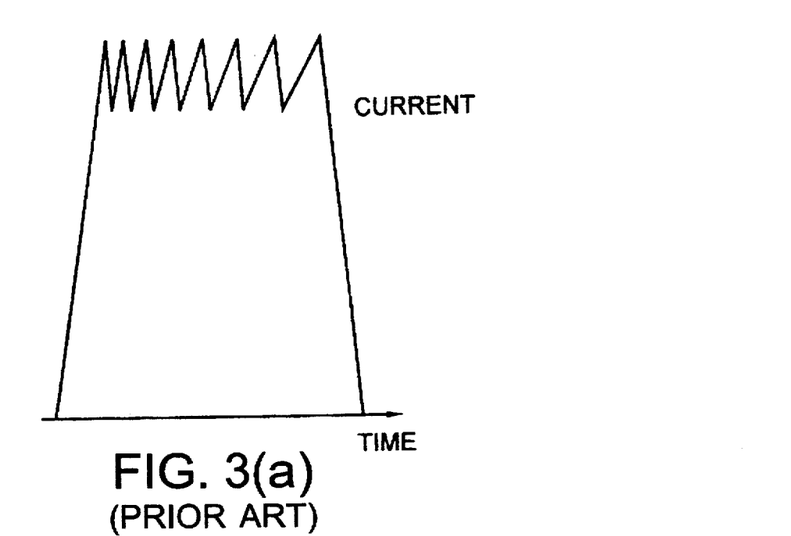
FIGS. 3(a) and (b) are graphs respectively of chopping mode and single-pulse mode switched reluctance motor winding current over a phase inductance period.
Figure 3B:
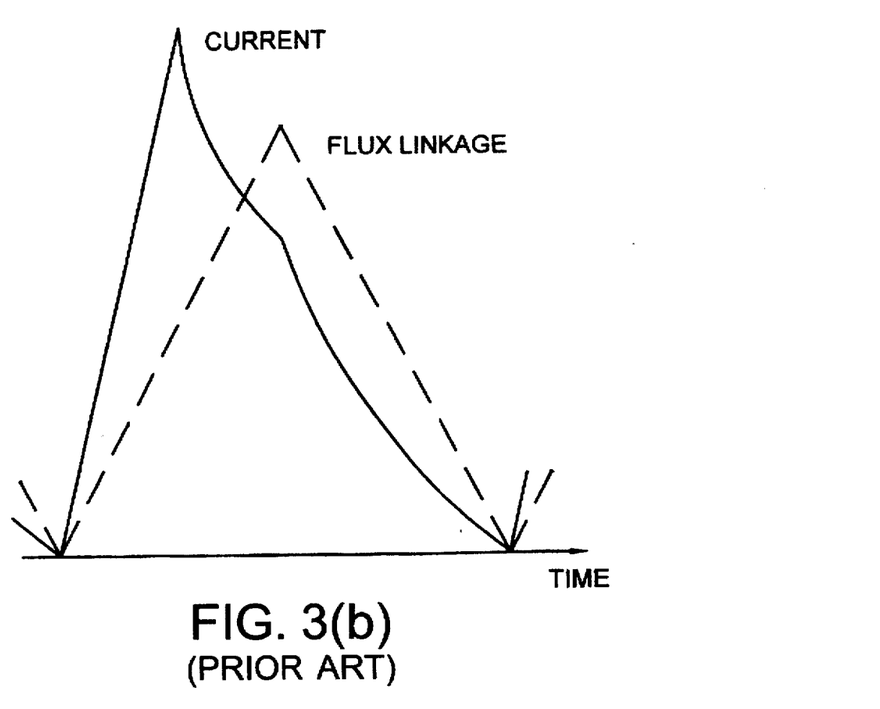

FIG. 3 (a) of the drawings illustrates the 'chopping' mode of motor torque control at low speed. The torque is controlled by inhibiting the winding current from rising above a maximum level by repeatedly chopping it during the phase conduction period. At higher speeds the rise and fall times for the current will be such that the current is switched on and off only once for each phase conduction period and is not chopped in normal operation. The torque is controlled through the switching angles, i.e. the angular positions at which voltage is applied to and reversed at the phase winding (s). This is the so-called 'single-pulse mode' of operation (See FIG. 3(b). The skilled person will be aware that the included angle between switch-on and switch-off is known as the conduction angle. The switch-on and switch-off angles in the single-pulse mode are derived with reference to some form of rotor position transducer, or other means of sensorless rotor position detection as is known in the art, collectively called a 'transducer', herein.

It is an object of the present invention to provide a simplified controller for an electric machine, such as a switched reluctance machine and some forms of permanent magnet machine.

According to the present invention there is provided a controller for an electric machine, including a stator defining stator poles and having at least one phase winding, a rotor defining rotor poles, and a switch for controlling current in the or each winding. In one embodiment the controller includes a transducer for deriving rotor position information and a timer that produces switch-on and switch-off signals that are provided to the switch. The timer may be arranged to receive a first output from the transducer indicative of a position of one of the rotor poles relative to one of the stator poles coincident with a switch-off point in the phase inductance cycle for operating the machine in one of a motoring and a generating mode, and to produce the switch-off signal in response thereto. A delay circuit may receive the output from the transducer within the phase inductance cycle, and generate a switch-on signal, subsequent to the switch-off signal, after a delay. The first and second outputs from the transducer may be coincident. Alternatively, the second output may be a point in the phase inductance cycle toward minimum or maximum phase inductance for motoring and generating modes, respectively.

SUMMARY OF THE INVENTION

The invention represents a very simple control technique for, e.g., an SR motor in which the switch-off angle coincides with a point on the phase inductance cycle which is chosen according to the motor being controlled. Usually, this will correspond to the optimum switch-off angle at a desired operating torque and speed for the motoring mode.

Preferably, the controller also includes a comparator operable to generate a trigger signal in response to a first input indicative of a winding current which is in excess of a current reference value, a pulse generator responsive to the trigger signal to generate a switch-off signal to which the switch means are also responsive, and a logic gate by which the switch-on signal applied to the switch means is at least dependent upon switch-on signals from both the pulse generator and the first delay means.

The controller may also include second delay means arranged further to delay the output from the first delay means to the logic gate, the said output from the first delay means being arranged to actuate one part of the switch means and the output of the logic gate being arranged to actuate another part of the switch means. In this case, it is preferable that the output of the comparator is also connected directly to the logic gate as overcurrent protection for the machine.

Preferably, the switch-off signal from the pulse generator is of a predetermined minimum duration.

The current reference value provides a chopping control reference threshold. Preferably the threshold current is above the peak value arranged to occur in the single-pulse mode which is effected by the timer and delay means.

It will be appreciated by those skilled in the art that as the speed of rotation of the rotor rises, the times required for the initial growth and final decay of current correspond to an increasing angle of rotor rotation. Thus, as the speed rises still further, the rise and fall times for the current in the windings will be such that the current is switched on and off only once in each conduction period and never reaches the threshold level at which chopping takes place. In the controller according to the present invention the speed of the motor reaches a stage at which the pulse generator is never triggered because the winding current fails to reach the threshold level in the phase inductance period. The logic gate is then constantly supplied with an enabling signal from the pulse generator and control of the motor in the high speed region is effected by the timer and delay means according to the rotor position information from the transducer. By adjusting the value of the delay time while the machine is operating at a given speed, the torque of the machine is controlled. Thus, preferably, the first delay means are adjustable to vary the delay to control the motor torque.

Preferably, the said second output from the transducer means to which the first delay means are responsive is indicative of a moment on the phase inductance cycle towards minimum inductance for motoring and towards maximum inductance for generating.

Alternatively, the first delay may be initiated by the first output from the transducer.

The new controller is simple and cheap to produce and can provide very effective control for applications such as fans, food processors, vacuum cleaners and other cost-sensitive devices.

The invention also extends to a method of single-pulse control of a switched reluctance machine comprising a stator, having at least one phase winding, a rotor and switch means associated with the phase winding, the method comprising:

timing actuation of the switch means to a point coincident with a switch-off point in the phase inductance cycle for operating the machine in one of a motoring and a generating mode to switch off current to the phase winding, and thereafter timing actuation of the switch means to switch on current to the phase winding after a delay.

Preferably, the method includes: comparing a maximum reference current value with a phase winding current; generating a switch-off signal when the phase winding current exceeds the reference current value; and gating the switch-off of the current to the phase winding in accordance with the phase inductance period.

Preferably, the method includes: timing switching on of a first part of the switch means to a first timed delay; and then further delaying switching off a second part of switch means, allowing the phase current to freewheel when the first part of the switch means are open and the second part of the switch means are closed.

Preferably, a pulse is initiated at the switch-off point which is of a predetermined duration. To cater for over-current situations, it is further preferable that the switch-off pulse is adjustable only down to a minimum duration.

The invention also extends to a switched reluctance drive including a switched reluctance machine comprising a stator, at least one phase winding, a rotor, a transducer for generating rotor position information, a switch for switching current to the winding, and a controller that includes: a comparator operable to generate a trigger signal in response to a first input indicative of a winding current exceeding a current reference value; a logic gate arranged to transmit switch-off and switch-on signals to the switch; and a pulse generator responsive to the trigger signal to generate the switch-off signal of predetermined duration to which the switch is responsive. The timer circuit may be operable to generate further switch-on and switch-off signals to which the switch is also responsive, and may be arranged to receive a first output from the transducer indicative of a position of one of the rotor poles relative to one of the stator poles coincident with a switch-off point in the phase inductance cycle for operating the machine in one of a motoring and a generating mode, and to generate the switch-off signal in response thereto. The drive may also include a delay circuit responsive to a second output from the transducer within the phase inductance cycle to generate the switch-on signal, subsequent to the switch-off signal, where the switch actuation signal from the logic gate being is dependent upon switch-on signals being received together from the pulse generator and the delay circuit.

BRIEF DESCRIPTION OF THE DRAWINGS

The present invention can be put into practice in various ways, some embodiments of which will now be described by way of example with reference to the accompanying drawings in which.

DETAILED DESCRIPTION OF THE INVENTION

The controller according to the invention may be used with machines having any number of phases. For clarity it will be described with reference to a single-phase motor.

Figure 4A:
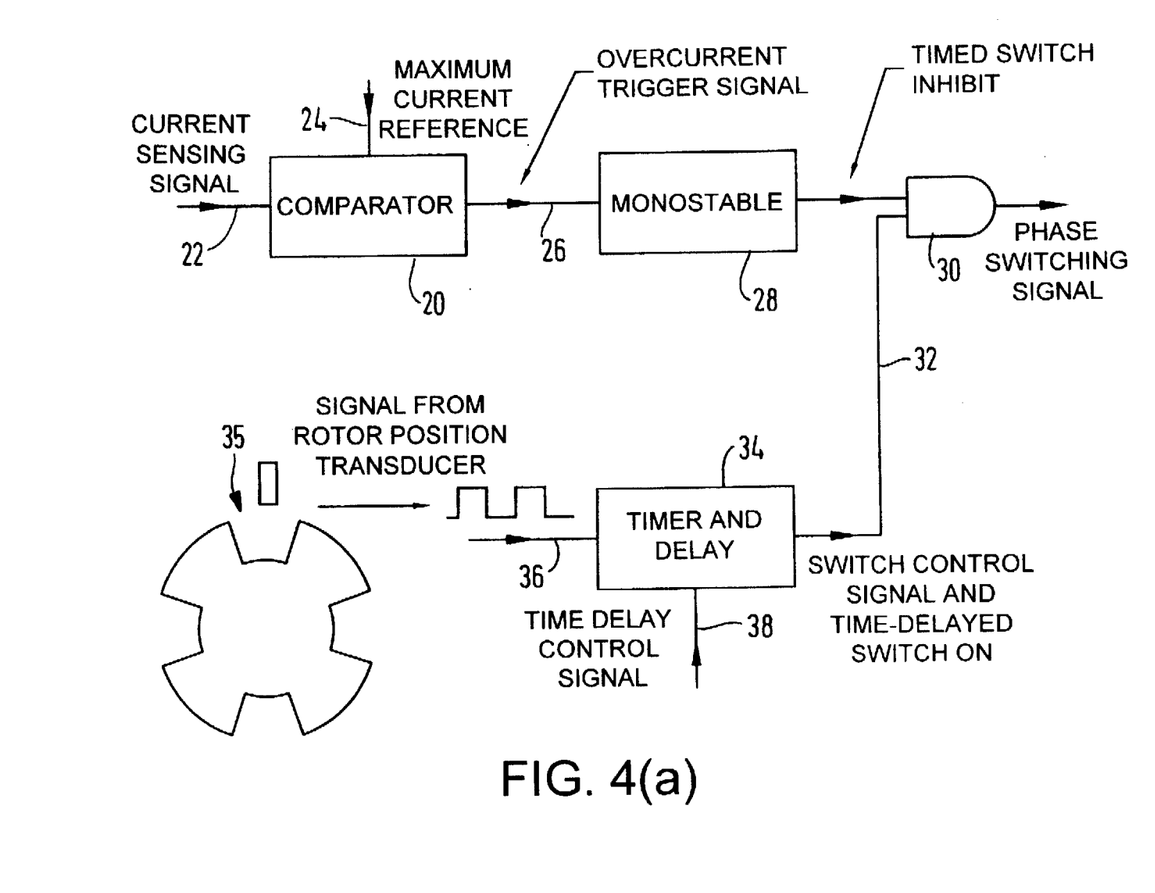
FIG. 4(a) is a schematic block diagram of a controller according to the invention.

Referring to FIG. 4(a), a controller for a switched reluctance motor comprises a comparator 20 which is arranged to receive a first input 22 that is a signal proportional to the phase winding current in the motor. A typical comparator for this application would be an LM339 manufactured by National Semiconductor with or without additional hysteresis components. In a multiphase machine the individual winding currents are monitored. The sum of the winding currents is not necessarily a sufficiently accurate indicator of the individual winding currents at any one time due to current overlap between the phases. If no overlap were present, or if the overlap could be compensated for, then a signal proportional to one phase winding current could be used as an indicator for all phases. Also, in principle one controller could multiplex between phases. However, care must be taken to avoid errors due to fault currents and noise from corrupting the information.

A second input 24 corresponds to a predetermined or adjustable maximum current reference signal. In the case of a fixed value of current reference a simpler comparator can be used, such as an appropriately biased transistor. In this embodiment, having the simplified comparator, the reference signal is chosen for a particular motor to correspond to a level of current which is above the peak value of current which will be allowed to occur in the single-pulse mode. This allows an automatic transition between chopping and single pulse modes of operation, as will be described below.

An output 26 from the comparator 20 triggers a simple pulse generator in the form of a monostable multivibrator 28 which has a pulse output of fixed duration at logic level '0' corresponding to a switch-off signal which is connected with one input of a two-input AND gate 30. The other input to the AND gate 30 is the output 32 from a timer and delay circuit 34. A first input 36 to the timer and delay circuit 34 is the output from a rotor position transducer 35 (RPT). The RPT 35 is conventional in the art. It is used to derive timing signals corresponding to the movement of the rotor poles past the stator poles in an SR or other electric motor. Conveniently, the output from the RPT is more or less a square or other wave shape providing transitions at fixed rotor positions with respect to the stator. A further input 38 to the timer and delay circuit 34 is a time delay control signal which adjusts the delay applied before a switch-on signal is applied to the AND gate 30. While an AND gate is illustrated it will be apparent that other mutual gating arrangements could be used to equal effect.

The running speed of the motor may be adjusted by manual adjustment of the delay introduced by the timer and delay output 32 which is itself controlled by the signal 38, or in response to a signal from an overall control system also adjusting the delay time. Alternatively, the output 32 may be fixed. The delay strategy is discussed below.

In a low-speed chopping mode the comparator 20 generates its output when the winding current (or the winding current for each respective phase in turn in a multiphase machine) exceeds the predetermined maximum current reference signal 24, which reference signal 24 is set for a particular motor to which the controller is connected. As mentioned above, this may be equivalent to a winding current which is in excess of the single-pulse mode current at which the motor in question is designed to operate. Typically, the maximum current reference level is chosen with regard to the ratings of the semiconductor switches 39 in the converter switching circuits and the thermal rating of the motor. The maximum current reference signal may be user adjustable, within the current rating of the switches, 39 so that a particular controller can be adjusted and set for a particular motor or as a means of speed-torque adjustment while the motor is running.

At low speeds there is sufficient time in a phase conduction period for the winding current to rise above the maximum current reference level. The output from the comparator generated when the maximum current reference is exceeded triggers the multivibrator 28 which produces a pulse of a fixed duration at logic level '0' which is a winding current switch inhibit (switch-off) signal. This logic '0' output will produce a logic '0' (switch-off) output from the AND gate 30 so that the switching circuit associated with the phase winding is opened for at least the duration of the low pulse, i.e. to allow the winding current to fall below the maximum current reference level. After the pulse is removed, the switch or switches 39 reclose subject to the state of the signal from the timer and delay circuit 34. Thus, chopping current control is established about the maximum current reference level when the motor speed is low.

As the motor speed increases there will come a point at which the maximum current reference level is not reached in a phase inductance cycle such that the output from the monostable is a constant logic '1'. This permanently enables the AND gate 30 subject to the timed output of the timer and delay circuit 34, which is then used to control the switching of current to the windings, i.e. for operating in the single pulse mode. The motor speed/torque is then controllable by adjustment of the delay before a switch-on signal is generated by the timer and delay circuit.

Figure 4B:
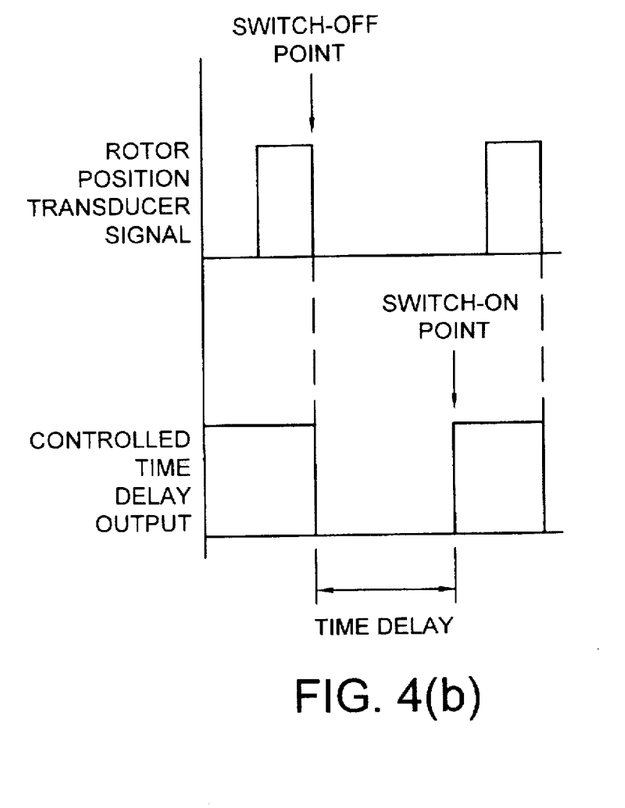
FIGS. 4(b) and (c) are graphs of switching strategies of two embodiments of the invention.
Figure 4C:
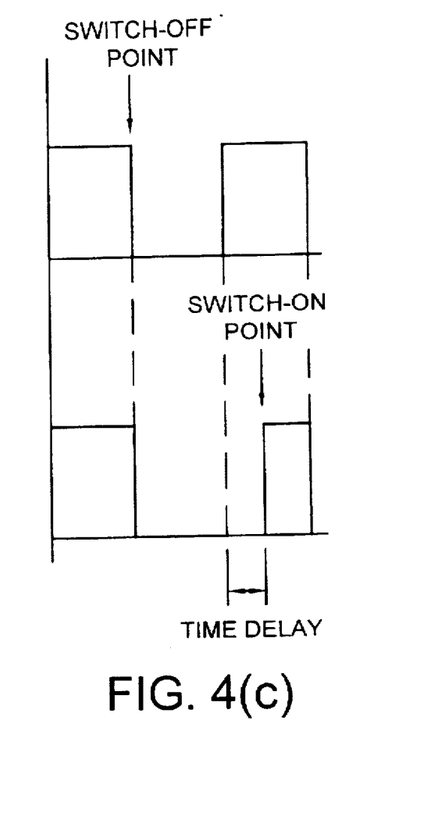

Two methods of triggering the time delay are illustrated graphically in FIG. 4(b) and (c).

The RPT output has a leading edge which is used conventionally to switch current to the phase winding, usually at a position in the phase inductance cycle corresponding to an optimum switch-on position eg. the position of minimum inductance for motoring and maximum inductance for generating. The use of an RPT from which to derive timing signals for winding switches 39 in single and multiphase SR motors is well known to those skilled in the art and will not be described further here.

In FIG. 4(b) the delay is initiated by the trailing (in this case falling) edge of the RPT signal. To the same end, the delay could be arranged to be initiated by the leading edge of the RPT signal. The time delay from switch-off may be set to give, for example, the optimum conduction angle at the desired full-power operating condition according to the motor being controlled, or it may be varied, using the delay circuit to control the torque and running speed of the motor. It will be noted that the mark/space ratio of the RPT signal is unimportant in this embodiment as only one transition of the signal, i.e. the leading edge, is used for controlling switching. Previously, the mark/space ratio of the RPT output has been critical to successful operation of the drive. According to the invention the need for only one transition can be used to realize a saving in the cost of the control electronics.

In this arrangement, as the speed is reduced with a given constant time delay, the delay angle is reduced as well and, therefore, the conduction angle increases. Eventually, at low motor speeds, the 'OFF' angle of the winding switches 39 becomes negligible relative to the increasing conduction angle. This is an undesirable condition because excessive winding current and/or torque of the undesired polarity can result. The effect can be countered by increasing the time delay as the speed falls.

In the FIG. 4(c) embodiment the time delay output of the timer and delay circuit (34) is initiated by the leading (in this case rising) edge of the RPT signal. The timer and delay circuit, the mark/space ratio of the RPT signal and its position in the inductance cycle may be set to give the optimum conduction angle for the single-pulse mode operation of the motor at the desired full power operating conditions, whilst additionally maintaining acceptable conditions at low speeds.

Figure 5:
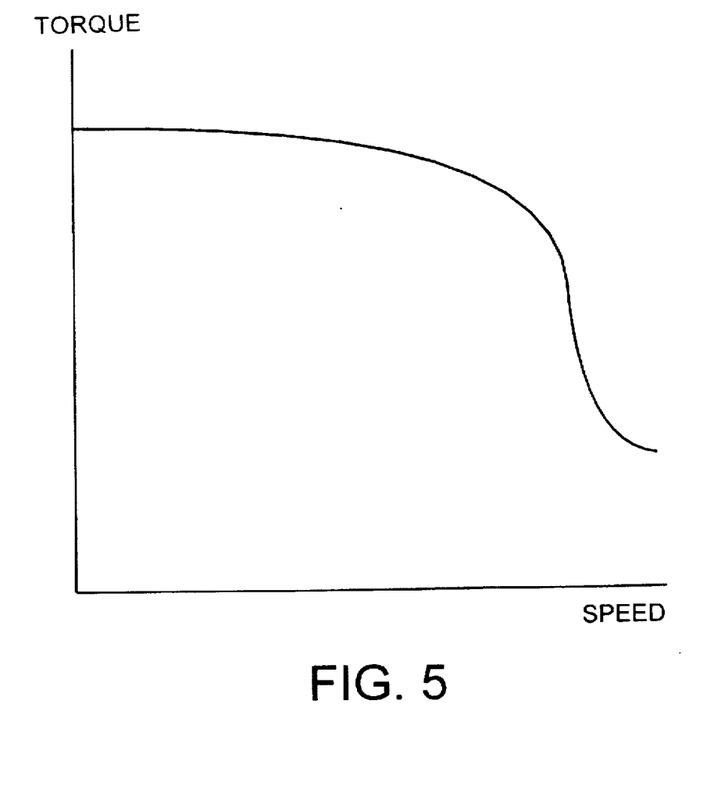
FIG. 5 is torque/speed characteristic of a switched reluctance motor controlled according to one embodiment of the invention.

As the speed of the motor rises, the time delay remains fixed and, therefore, the delay angle of switch-on increases. This delay angle is the angle corresponding to the time delay and is the angle by which the switch-on lags behind the fixed angle corresponding to the RPT leading edge. This increasing delay angle reduces the conduction angle. There is, therefore, a fall in the peak flux with rising speed caused by two effects: (a) the reducing conduction angle itself; and (b) the rising speed giving a reducing conduction time for a given conduction angle. The torque, therefore, falls more rapidly with rising speed than in a conventional system in which the conduction angles are fixed. FIG. 5 illustrates the torque/speed curve of a motor control system according to this embodiment of the invention when a fixed chopping level and a fixed time delay are used. The relatively steep fall-off in torque is advantageous in applications in which the load torque varies significantly in normal operation. It can be beneficial that the rise in speed consequent upon a reduction in load torque is more limited than in conventional control systems for universal motors.

In some circumstances the second embodiment of the invention may be preferred. At low speed, for a given delay, the delay angle becomes small and the conduction angle becomes substantially equal to the on-state signal of the rotor position transducer. This is an acceptable condition for low speed running.

The first embodiment of the invention does give rise to an even steeper torque/speed curve in the single-pulse operating region. The timer and delay circuit delay is set for a desired normal operating condition. This delay is much longer in the first method than in the second method. A given percentage rise in speed from this initial operating condition will cause an equal percentage rise in the delay angle, provided the delay time is constant. This causes a corresponding reduction in the conduction angle. Because the delay time for the given initial operating condition is greater in the: first than in the second method, the reduction in conduction angle, for the given percentage rise in motor speed, is greater in the first method. This results in a greater reduction in the peak flux and in torque for the same percentage rise in speed in the first method than in the second. The torque/speed curve, therefore, falls more rapidly with the first method and the speed of the motor will vary less with given rates of load torque. Thus, the first method may be preferred in some applications.

The single-phase SR motor illustrated in FIG. 1 is not inherently self-starting. It is necessary to ensure that the initial rotor position is not one of zero torque when the motor winding is excited. To address this a magnet arranged on a stator pole may be used in accordance with the teachings in EP-A-0601818. The magnet serves to bias the rotor to a non-zero torque position by urging a near rotor pole past the zero torque orientation. The force exerted by the magnet may be limited and its use attached to one of the stator poles is restricted to drives requiring only modest starting torque.

The invention is not restricted to single-phase motors. It is equally applicable to multiphase machines. In the case of multiphase machines the motor phase switching signals are further controlled, according to well-known motor control techniques, to control the actuation of the windings of the various phases in turn.

Figure 2A:
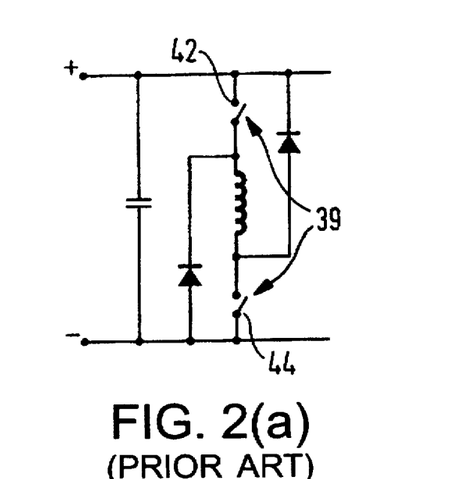
FIGS. 2(a)–(d) illustrate schematically known switched reluctance motor switching circuits.
Figure 2B:
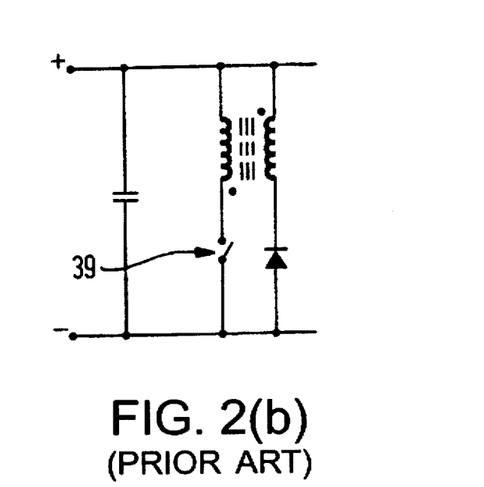
Figure 2C:
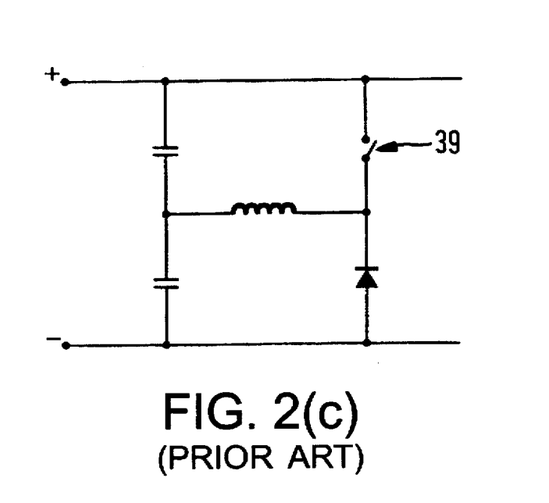
Figure 2D:
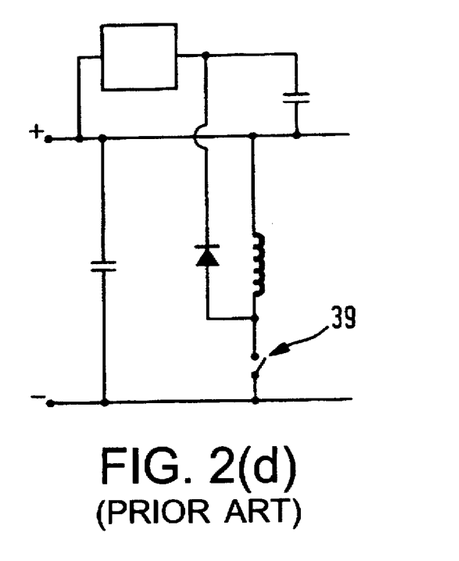
Figure 6:
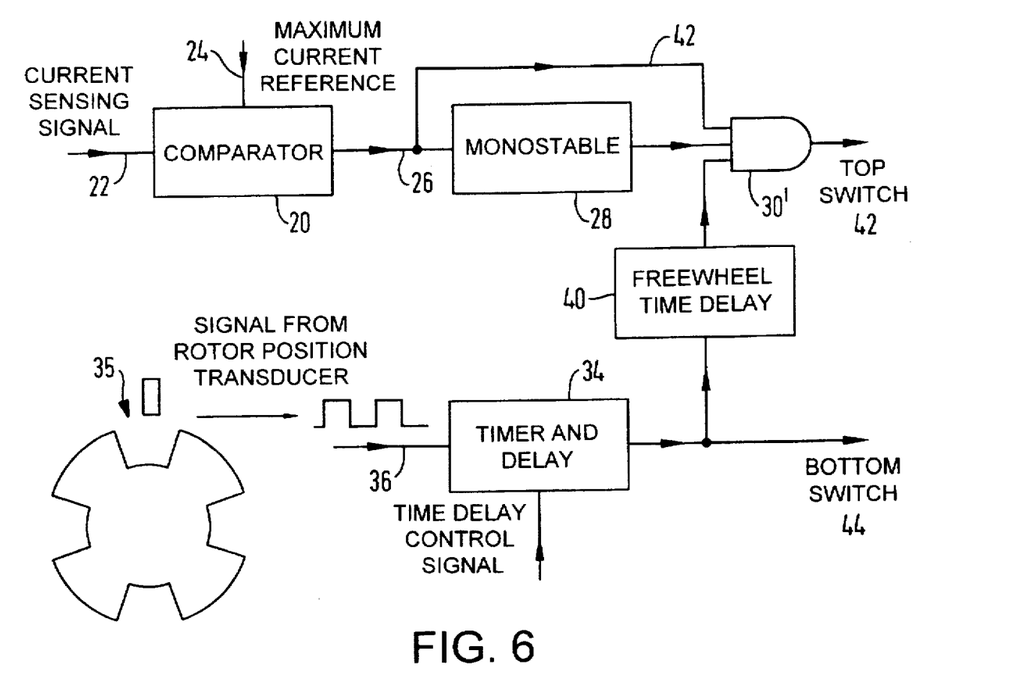
FIG. 6 is a schematic block diagram of a further embodiment of the invention.

Referring to FIG. 6 of the drawings, the invention can also be used with a freewheeling switch configuration in which a two switch per phase arrangement (as shown in FIG. 2(a) can be actuated to allow current to recirculate around the phase winding. Freewheeling is a technique well-known in the art of controller design for SR machines. It is often used to reduce peak currents, switching frequencies and/or acoustic noise. In FIG. 6 a further freewheel delay circuit 40 is added between the output of the timer and delay circuit 34 and an AND gate 30'. The AND Gate 30' is now confined to controlling switching of only one of the two winding switches (eg. the 'top switch 42').

The freewheel timer delay signal is gated according to the monostable output. Additionally, a direct connection 42 from the comparator itself is connected to the AND gate 30'This direct connection 42 provides overcurrent protection in the event that the winding current has not fallen sufficiently during the monostable pulse output duration.

The timer and delay circuit 34 sends a timing switch-off signal which is applied directly to the other of the two winding switches (eg. the 'bottom switch 44'). After a freewheel delay in which the bottom switch 44 is open and the top switch 42 is closed the switch-off signal is applied as a low signal to the AND gate 30'. The switch-off signal applied to the top switch 42 is then gated according to the output of the monostable 28 as before (subject to no overcurrent low signal from the comparator 20 on the line 42. The freewheel time delay is determined for a particular machine and its operating regime. Typically, it will be a fraction of the delay from the timer and delay circuit. Thus, a freewheel configuration is available in which the bottom switch 44 is open, according to the timer and delay circuit output, and the top switch 42 closed, according to the further delayed timing signal from the freewheel delay, as gated by the monostable 28, for each inductance period.

While the invention has been described in connection with the illustrative embodiments discussed above, those skilled in the art will recognize that many variations may be made without departing from the present invention. For example, it will be appreciated by the skilled person that the signals from the RPT 35 can be derived in other ways to equal effect. The RPT 35 is an arrangement of a member mounted on the rotor shaft and arranged to influence the output of a sensor to produce appropriately timed pulses. However, as well as other physical/electrical/magnetic ways of deriving rotor position information for movement of the rotor, the same information can be derived from monitoring the phase current. The invention is able to use such rotor position information however it is derived.

Accordingly, the above description of several embodiments is made by way of example and not for the purposes of limitation. The present invention is intended to be limited only by the scope of the following claims.

What is claimed is:

1. A controller for an electric machine, comprising a stator defining stator poles and having at least one phase winding, a rotor defining rotor poles, and switch means for controlling current in the winding, the controller comprising:

a transducer for deriving rotor position information;

a timer operable to produce switch-on and switch-off signals to which the switch means are responsive, the timer being arranged to receive a first output from the transducer indicative of a position of one of the rotor poles relative to one of the stator poles coincident with a switch-off point in the phase inductance cycle for operating the machine in one of a motoring and a generating mode, and to produce the switch-off signal in response thereto; and first delay means responsive to a second output from the transducer within the phase inductance cycle to generate a switch-on signal, subsequent to the switch-off signal, after a delay.

2. A controller as claimed in claim 1 in which the first and second outputs from the transducer are the same output.

3. A controller as claimed in claim 1 in which the second output is a point in the phase inductance cycle towards minimum phase inductance when the machine is motoring and maximum phase inductance when the machine is generating.

4. A controller as claimed in claim 3, including a comparator having a first input for a signal indicative of a winding current and a second input for a signal indicative of a current reference value, the comparator being operable to generate a trigger signal in response to the winding current being in excess of the current reference value, a pulse generator responsive to the trigger signal to generate a further switch-off signal of predetermined duration and a further switch-on signal to which the switch means are also responsive, and gate means by which the switch-on signal for the switch means is at least dependent upon the switch-on signals from both the pulse generator and the first delay means.

5. A controller as claimed in claim 3, including a comparator having a first input for a signal indicative of a winding current and a second input for a signal indicative of a current reference value, the comparator being operable to generate a trigger signal in response to the winding current being in excess of the current reference value, a pulse generator responsive to the trigger signal to generate a further switch-off signal of predetermined duration and a further switch-on signal to which the switch means are also responsive, and gate means by which the switch-on signal for the switch means is at least dependent upon on the switch-on signals from both the pulse generator and the first delay means, the controller further including second delay means arranged further to delay the second output from the transducer to the gate means.

6. A controller as claimed in claim 5 in which the trigger signal output of the comparator is connected directly with the gate means, such that the switch-on signal is inhibited when the first input is indicative of the winding current exceeding the current reference value.

7. A controller as claimed in claim 4 in which the pulse generator is arranged to generate the switch-off signal as an adjustable pulse of predetermined minimum duration.

8. A controller as claimed in claim 7 in which the transducer is arranged to produce a pulse output, having a leading edge and a trailing edge.

9. A controller as claimed in claim 8 in which the first and second outputs from the transducer are the same output and the output from the transducer is one of the leading and trailing edges of the said pulse-output, the switch-on signal being independent of the other of the leading and trailing edges of the pulse.

10. A method of single pulse control of a switched reluctance machine comprising a stator, having at least one phase winding, a rotor and switch means associated with the phase winding, the method comprising:

timing actuation of the switch means to switch off current to the phase winding to a point coincident with a switch-off point in the phase inductance cycle for operating the machine in one of a motoring and a generating mode, and thereafter timing actuation of the switch means to switch on current to the phase winding after a delay.

11. A method as claimed in claim 10, including initiating the start of the delay at a later point in the phase inductance cycle.

12. A method as claimed in claim 11, wherein the switch means comprises first and second switches, and wherein the method further includes the steps of timing switching off the first switch to a first timed delay; and then further delaying switching off the second switch and allowing the phase current to freewheel when the first switch is open and the second switch is closed.

13. A method as claimed in claim 12, further including chop controlling the machine by comparing a maximum reference current value with a phase winding current; generating a switch-off signal when the phase winding current exceeds the reference current value; and gating the switch-off of the current to the phase winding in accordance with the phase inductance period.

14. A method as claimed in claim 13 in which the output of the machine is varied by adjusting the duration of the delay above a predetermined minimum period.

15. A method as claimed in claim 14 including deriving timing pulses from rotation of the rotor.

16. A method as claimed in claim 14 including deriving timing pulses from the rotation of the rotor in which the timing of the actuation of the switch means to switch-off current to the phase winding is dependent on the occurrence of one of the leading and trailing edges of the said timing pulse, and timing actuation of the switch means to switch-on current to the phase winding is independent of the other of the leading and trailing edges of the pulse.

17. A switched reluctance drive including a switched reluctance machine comprising a stator, having at least one phase winding, a rotor, a transducer for generating rotor position information, switch means for switching current to the winding and a controller, the controller comprising:

a comparator operable to generate a trigger signal in response to a first input indicative of a winding current exceeding a current reference value;

a logic gate arranged to transmit switch-off and switch-on signals to switch means;

and a pulse generator responsive to the trigger signal to generate the switch-off signal of predetermined duration to which the switch means are responsive;

a timer circuit operable to generate further switch-on and switch-off signals to which the switch means are also responsive, the timer circuit being arranged to receive a first output from the transducer indicative of a position of one of the stator poles relative to one of the stator poles coincident with a switch-off point in the phase inductance cycle for operating the machine in one of a motoring and a generating mode, and to generate the switch-off signal in response thereto; and delay means responsive to a second output from the transducer within the phase inductance cycle to generate the switch-on signal, subsequent to the switch-off signal, the switch means actuation signal from the logic gate being dependent upon switch-on signals being received together from the pulse generator and the delay means.

* * * * *